(12) United States Patent
Kimmel et al.

(10) Patent No.: US 8,478,835 B2
(45) Date of Patent: Jul. 2, 2013

(54) METHOD AND SYSTEM FOR USING SHARED MEMORY WITH OPTIMIZED DATA FLOW TO IMPROVE INPUT/OUTPUT THROUGHOUT AND LATENCY

(75) Inventors: Jeffrey S. Kimmel, Chapel Hill, NC (US); Steve C. Miller, Livermore, CA (US); Ashish Prakash, Santa Clara, CA (US)

(73) Assignee: NetApp. Inc., Sunnyvale, CA (US)

( * ) Notice: Subject to any disclaimer, the term of this patent is extended or adjusted under 35 U.S.C. 154(b) by 575 days.

(21) Appl. No.: 12/175,426

(22) Filed: Jul. 17, 2008

(65) Prior Publication Data

US 2010/0017496 A1    Jan. 21, 2010

(51) Int. Cl.
*G06F 15/167* (2006.01)

(52) U.S. Cl.
USPC ........... 709/212; 709/213; 709/214; 709/215; 709/216; 711/141; 711/144; 711/145; 711/147; 711/148; 711/153

(58) Field of Classification Search
USPC .......... 709/212, 213, 214, 215, 216; 711/141, 711/144, 145, 147, 148, 153
See application file for complete search history.

(56) References Cited

U.S. PATENT DOCUMENTS

| | | | |
|---|---|---|---|
| 6,421,711 B1 | 7/2002 | Blumenau et al. | |
| 6,574,667 B1 | 6/2003 | Blumenau et al. | |
| 7,020,754 B1* | 3/2006 | Walton et al. | 711/162 |
| 7,149,922 B2 | 12/2006 | Sonoda et al. | |
| 2004/0117562 A1* | 6/2004 | Wu et al. | 711/147 |
| 2005/0097273 A1 | 5/2005 | Kanai | |
| 2005/0204096 A1* | 9/2005 | Shimada | 711/113 |
| 2005/0240724 A1* | 10/2005 | Koizumi et al. | 711/113 |
| 2006/0090042 A1* | 4/2006 | Nakatani et al. | 711/147 |
| 2007/0050591 A1* | 3/2007 | Boyd et al. | 711/171 |
| 2007/0180239 A1* | 8/2007 | Fujibayashi et al. | 713/165 |
| 2008/0082746 A1* | 4/2008 | Nakamura et al. | 711/113 |

FOREIGN PATENT DOCUMENTS

EP    1580656 A1    9/2005

OTHER PUBLICATIONS

International Search Report PCT/US2009/049963 dated Feb. 2, 2010, pp. 1-4.
Written Opinion PCT/US2009/049963 dated Feb. 2, 2010, pp. 1-4.

\* cited by examiner

*Primary Examiner* — Liangche A Wang
*Assistant Examiner* — Cheikh Ndiaye
(74) *Attorney, Agent, or Firm* — Perkins Coie LLP

(57) ABSTRACT

The data path in a network storage system is streamlined by sharing a memory among multiple functional modules (e.g., N-module and D-module) of a storage server that facilitates symmetric access to data from multiple clients. The shared memory stores data from clients or storage devices to facilitate communication of data between clients and storage devices and/or between functional modules, and reduces redundant copies necessary for data transport. It reduces latency and improves throughput efficiencies by minimizing data copies and using hardware assisted mechanisms such as DMA directly from host bus adapters over an interconnection, e.g. switched PCI-e "network". This scheme is well suited for a "SAN array" architecture, but also can be applied to NAS protocols or in a unified protocol-agnostic storage system. The storage system can provide a range of configurations ranging from dual module to many modules with redundant switched fabrics for I/O, CPU, memory, and disk connectivity.

19 Claims, 8 Drawing Sheets

METHOD AND SYSTEM FOR USING SHARED MEMORY WITH OPTIMIZED DATA FLOW TO IMPROVE INPUT/OUTPUT THROUGHOUT AND LATENCY

FIELD OF THE INVENTION

At least one embodiment of the present invention pertains to network storage systems, and more particularly, to a network storage server that includes shared memory among functional modules or processes used for communications with clients and storage devices.

BACKGROUND

A storage server is a computer system that is used to store and retrieve data on behalf of one or more clients on a network. A storage server operates on behalf of one or more clients to store and manage data in a set of mass storage devices, such as magnetic or optical storage-based disks or tapes. In conventional network storage systems, the mass storage devices can be organized into one or more groups of drives (e.g., redundant array of inexpensive drives (RAID)).

A storage server can be configured to service file-level requests from clients, as in the case of file servers used in a network attached storage (NAS) environment. Alternatively, a storage server can be configured to service block-level requests from clients, as done by storage servers used in a storage area network (SAN) environment. Further, some storage servers are capable of servicing both file-level and block-level requests, as done by certain storage servers made by NetApp, Inc. of Sunnyvale, Calif.

Distributed network storage architectures can include one or more "network" (N) modules, one or more "data" (D) modules, and an interconnect protocol to communicate data between N-modules and D-modules. While this approach works for massively distributed systems and horizontal scale-out, the throughput, latency, availability and service levels required for "Tier 1" applications demand highly optimized, low overhead data paths within a storage system.

Tier 1 is an enterprise level of computing or storage system where there is a guaranteed quality of service under specified conditions including system failures. For example, a Tier 1 system might provide access to bank ATM machines which will allow access 24/7 even in the presence of some hardware or software failures. This includes a maximum response time. Symmetric access (i.e., to provide the required quality of service and guaranteed response time, multiple paths are needed and those paths require identical or very similar response times) as well as balancing loads are important in Tier 1 system implementations to provide a storage system capable of scaling while providing high, stable, predictable performance and guaranteed service levels. Tier 1 SAN storage systems provide multiple redundant paths from clients to storage systems for redundancy and scaling Input/Output (I/O) performance. Storage systems run multi-pathing software to exploit these redundant paths to their storage devices. In order for the redundant paths to be used seamlessly for load balancing I/O and for handling controller or path failures, these paths are presented as "symmetric".

In certain storage systems, the existence of different data paths from clients to stored data result in different data access times or latencies. This in turn can result in unbalanced load. Also, data often has to go through multiple levels of switched connections between client applications, modules, storage disks, and interfaces in a read or write process. In a read or write process, multiple duplicate copies of data being read or written often need to be made, to go through those multiple interconnections. To improve the performance of storage servers and to provide predictable/stable performance, therefore, it is desirable to reduce the latency and improve throughput efficiencies by optimizing the data path between the client applications and the disk storages and reducing redundant copies of data. Further, it is desirable to implement symmetric access and balanced load for a Tier 1 system.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
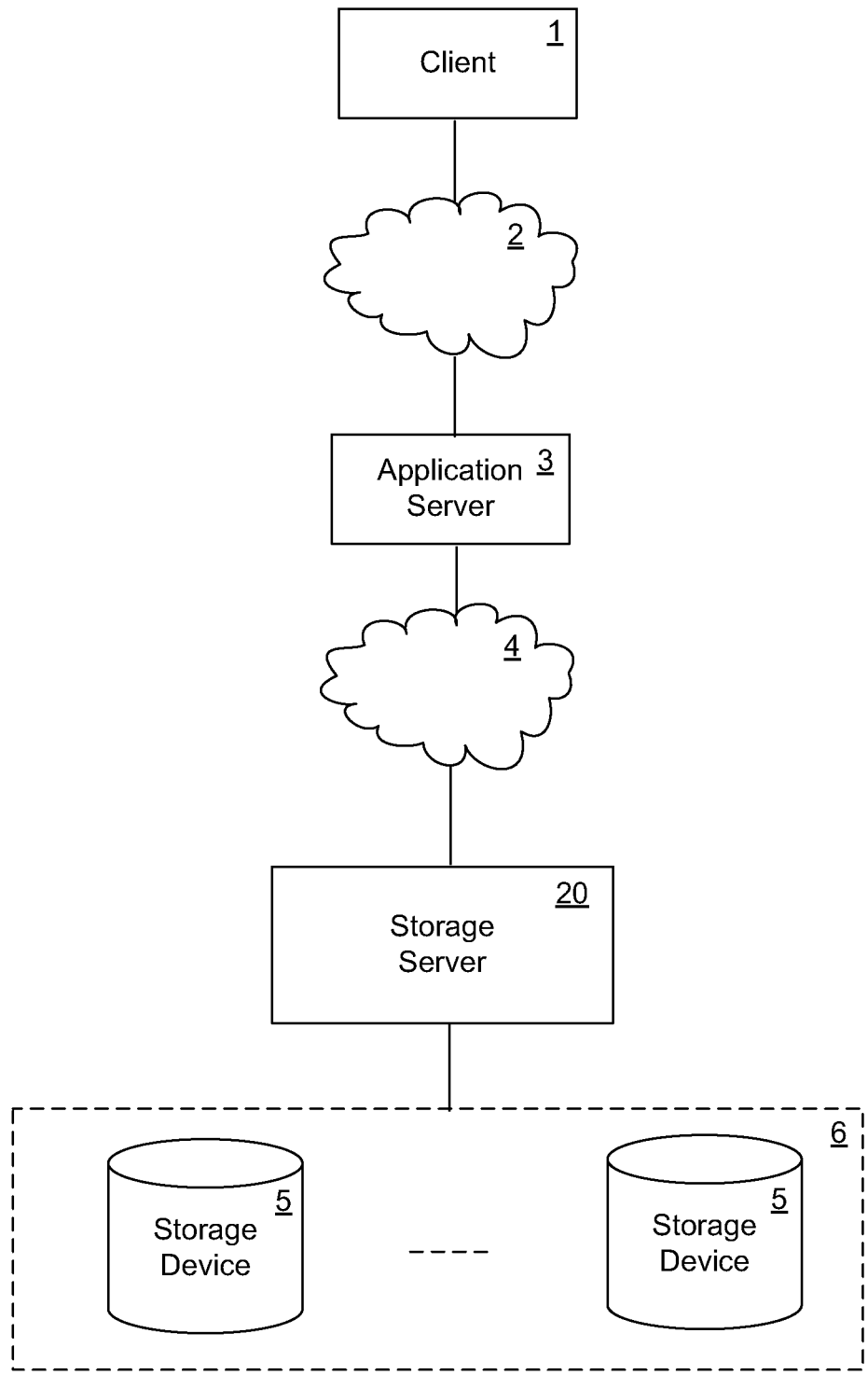
FIG. 1 illustrates a Storage Area Network (SAN) system environment.

A method and system for using shared memory with optimized dataflow to improve input/output (I/O) throughput and reduce latency in a network storage system are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The technique introduced here includes sharing a memory among multiple functional modules that form a storage system, such as N- and D-modules, to allow communication between these modules via the shared memory, with efficient direct memory access (DMA) mechanisms between this memory, functional modules, and storage devices. DMA is a feature of modern computers that allows certain hardware subsystems within the computer to access system memory for reading and/or writing independently of the central processing unit. This scheme is well suited for a SAN architecture, but also can be applied to NAS protocols or other protocols and architectures. The storage system can provide a range of configurations from dual module to many modules with redundant switched fabrics for I/O, CPU, memory, and disk connectivity.

Using shared memory in this manner avoids having to write multiple copies of the data being read or written along each step of the communication path. In certain storage systems, different functional modules need to make multiple duplicate copies of the same data at various points of the data path as explained below for FIG. 6. Further, sharing memory among distributed functional modules provides more reliable implementation and inter-module communication. Performing data transfers using hardware capabilities (e.g., DMA) reduces scheduling latencies and relieves CPU path-length problems. For example, in a system where N-module and D-module software components are used with a communication protocol to connect them, relying on software for forwarding data can imply relying on scheduling processes on CPUs, making latency for forwarding unpredictable if the CPU is shared by many processes on that system. Dedicating CPU cores to the forwarding function has an adverse affect on system costs. Further, a data path through multiple software protocols usually requires data to be copied multiple times because data needs to be wrapped into a format required by the protocol and forwarded over network, only to be copied again on another module.

Further, a distributed storage system using shared memory makes for a much more reliable implementation and inter-module communication. By using a memory for sharing data among functional modules and using "commodity" hardware, e.g. Infiniband or Ethernet, better performance and service levels can be provided at competitive costs.

The technique introduced here provides a streamlined data path between the network interface and disk interface of a storage system node, taking into account redundancy in the form of module, memory and disk faults. To provide redundancy, the required quality of service, and a guaranteed response time, multiple paths are needed and those paths require identical or very similar response times. This symmetric access is important to providing a storage system capable of scaling while providing high, stable, predictable performance and guaranteed service levels. The data path is streamlined for symmetric active-active access to data on multiple modules and multiple network (Fiber Channel (FC) and Ethernet) ports. The active-active access is the method of allowing all nodes to operate and serve data. If one node fails, one of its partners must be able to resume the failed node's work, and hence must be able to access the resources. The streamlined data path reduces latency and improves throughput efficiencies by minimizing overheads and data copies and using hardware assisted mechanisms such as DMA directly from host bus adapters over an internal switched fabric, such as a Peripheral Component Interconnect Express (PCIe) "network". Performing data transfers using hardware capabilities, i.e. DMA prevents scheduling latencies and reduces CPU path-length, i.e. the amount or length of time it take for the CPU to execute a section of code to provide a given function.

Using the shared memory and DMA serves two functions: first, more efficient communication among functional modules (e.g. transferring data access requests or data from an N-module that interfaces with clients to shared memory, and reading the data from or writing the data to the shared memory by a D-module); second, ensuring redundant copies are stored efficiently for availability purposes (in the event of a fault).

FIG. 1 illustrates a Storage Area Network (SAN) system environment in which the present invention can be implemented. Storage area network (SAN) is an architecture to attach remote computer storage devices (such as disk arrays, tape libraries, etc.) to servers in such a way that, to the host (client) operating system, the devices appear as locally attached. In contrast with a SAN, Network-Attached Storage (NAS) uses file-based protocols such as Network File System (NFS) or Server Message Block (SMB)/Common Internet File System (CIFS) where it is clear to the host that the storage is remote, and computers request a portion of a file rather than a range of disk blocks.

The SAN system is used here only as an example, and the present invention can be implemented in a NAS environment, or a combination of SAN and NAS environment, or other form of network storage environment. In FIG. 1, a set of clients 1 is connected to an application server 3 through an interconnect 2. The interconnect 2 can be, for example, a local area network (LAN), wide area network (WAN), metropolitan area network (MAN), global area network such as the Internet, a Fibre Channel fabric, or any combination of such interconnects. Each of the clients 1 can be, for example, a conventional personal computer (PC), server-class computer, workstation, handheld computing/communication device, or the like. The application server 3 is also connected to a storage server 20 through an interconnect 4. Interconnect 4 also can be any of a variety of interconnection types as described for interconnect 2.

Storage server 20 is coupled to a storage subsystem 6 that includes multiple non-volatile mass storage devices 5. Storage of data in the storage devices 5 is managed by the storage server 20. The storage server 20 receives and responds to various data access requests (e.g. read and write requests) from the application server 3, directed to data stored in or to be stored in the storage devices 5. The mass storage devices 5 can be, for example, conventional magnetic or optical disks or tape drives; alternatively, they can be non-volatile solid-state memory, such as flash memory. The mass storage devices 5 can be organized as a Redundant Array of Inexpensive Disks/Devices (RAID), in which case the storage server 20 accesses the storage devices 5 using one or more well-known RAID protocols.

In one embodiment, the storage server 20 is a block-level storage server in FIG. 1. In another embodiment, the storage server 20 can be file-level server, such as if used in a NAS environment, or a storage server which is capable of providing both file-level and block-level service in a combined environment. Further, although the storage server 20 is illustrated as a single unit in FIG. 1, it can have a distributed architecture with multiple functional modules to divide tasks. For example, the storage server 20 can include a physically separate network module (e.g., "N-module") and disk data module (e.g., "D-module") (not shown), which communicate with each other over an external interconnect, as described further below.

Figure 2:
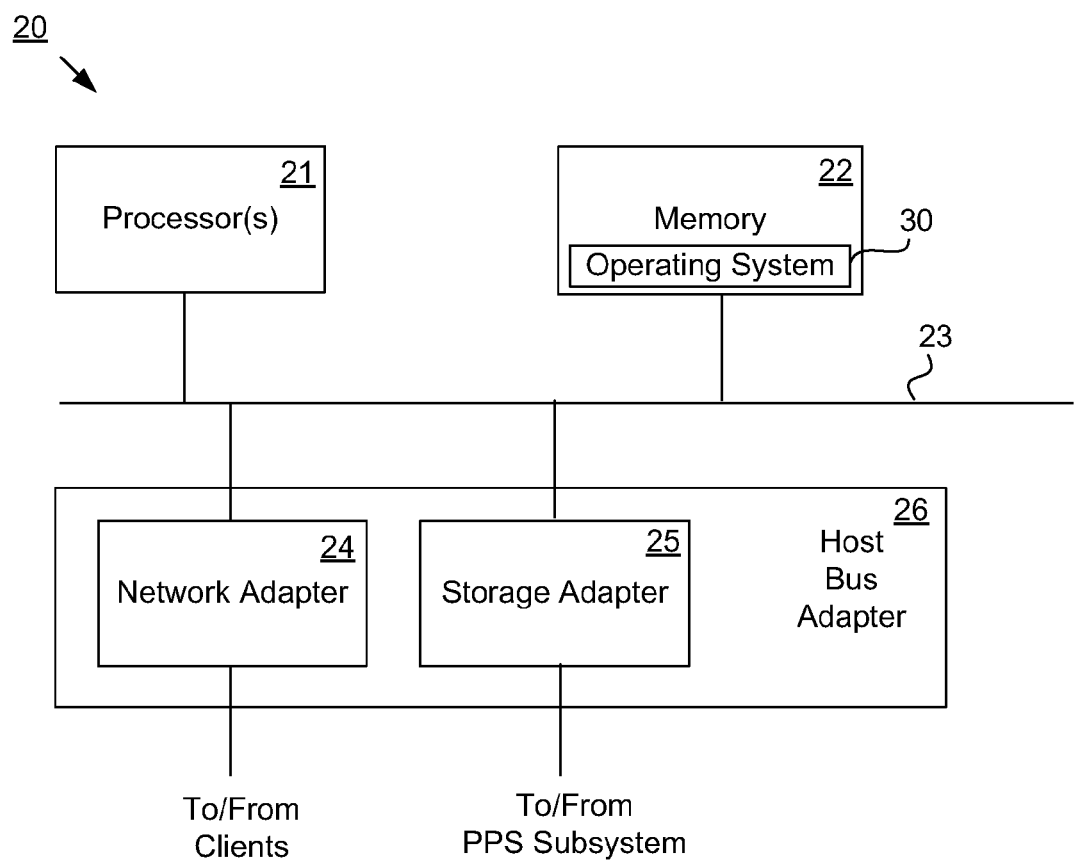
FIG. 2 is a high-level block diagram showing an example of the architecture of a storage server.

FIG. 2 is a high-level block diagram showing an example of the hardware architecture of a storage server 20. The storage server 20 includes one or more processors 21 and memory 22 coupled to an interconnect 23. The interconnect 23 shown in FIG. 2 is an abstraction that represents any one or more separate physical buses, point-to-point connections, or both connected by appropriate bridges, adapters, or modules. The interconnect 23, therefore, can include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 21 can include central processing units (CPUs) of the storage server 20 and, thus, control the overall operation of the storage server 20. In certain embodiments, the processor(s) 21 accomplish this by executing software and/or firmware stored in memory 22. The processor(s) 21 can be, or can include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 22 is or includes the main memory of the storage server 20. The memory 22 represents any form of random access memory (RAM), read-only memory (ROM), flash memory, or the like, or a combination of such devices. In use, the memory 22 can contain, among other things, at least a portion of the storage operating system 30 of the storage server 20.

Also connected to the processor(s) 21 through the interconnect 23 are a network adapter 24 and a storage adapter 25 and both are part of a Host Bus Adapter (HBA) 26 that connects a storage server to other network and storage devices. HBA 26 is implemented as a fabric connecting with individual devices. The network adapter 24 provides the storage server 20 with the ability to communicate with remote devices, such as application server 3 and/or clients 1, over the interconnect 4 and/or 2 and can be, for example, an Ethernet adapter or Fibre Channel adapter. The storage adapter 25 allows the storage server 20 to access the storage subsystem that includes multiple non-volatile mass storage devices, i.e. storage devices 5, and can be, for example, a Fibre Channel adapter or a SCSI adapter.

Figure 3:
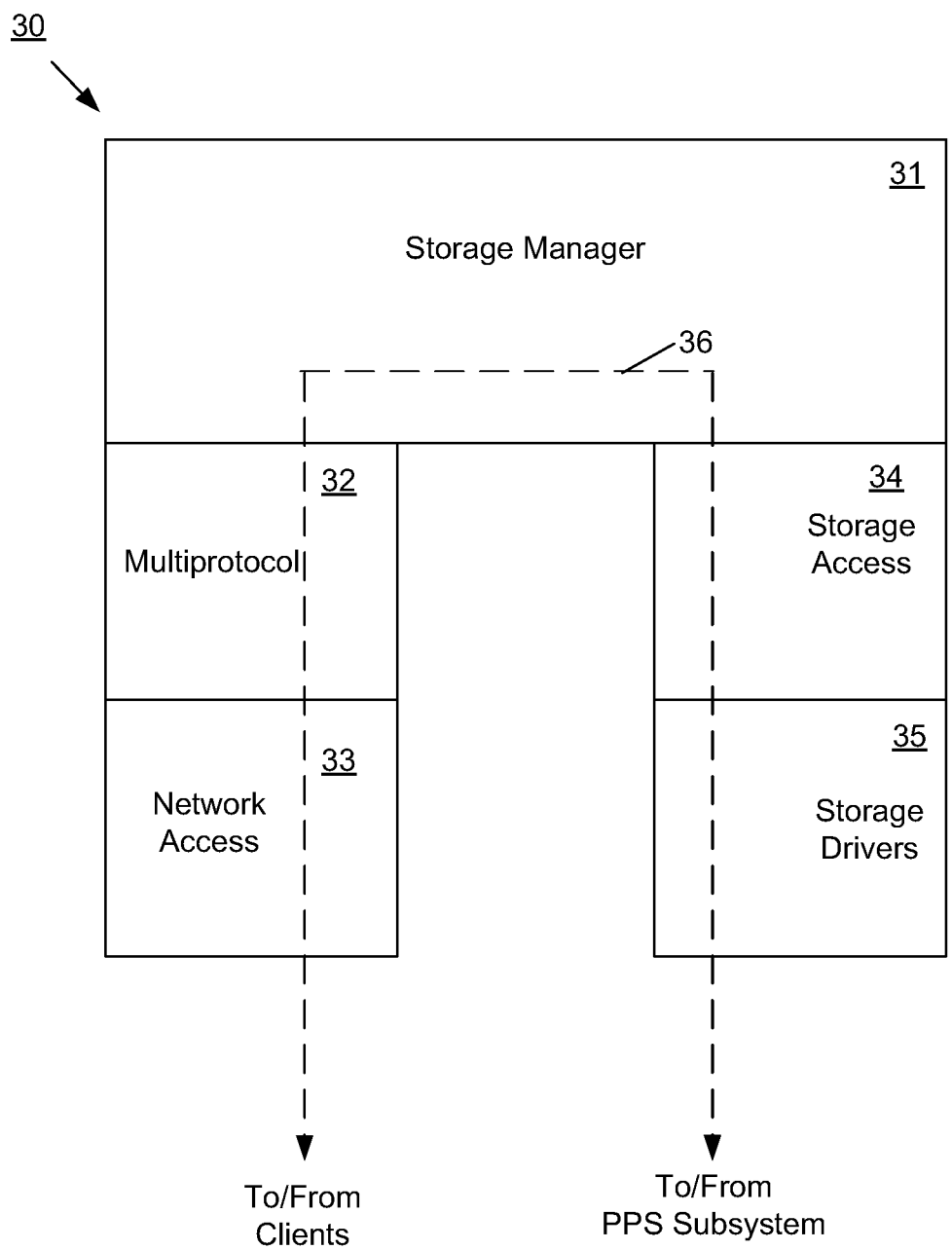
FIG. 3 illustrates an example of a storage operating system of a storage server.

FIG. 3 schematically illustrates an example of a storage operating system that can be implemented in the storage server 20. In the illustrated embodiment, the storage operating system 30 includes several software modules, or "layers". These layers include a storage manager 31, which is the core functional element of the storage operating system 30. The storage manager 31 imposes a structure (e.g., a hierarchy) on the data stored in the storage devices 5 and services read and write requests from clients. In certain embodiments, the storage manager 31 manages a log-structured file system and implements a "write-anywhere" data layout policy when writing data to the storage devices 5. In other words, whenever a logical data block is modified, that logical data block, as modified, is written to a new physical storage location (physical block), rather than overwriting the data block in place. In other embodiments, the storage manager 31 implements a "write-in-place" data layout policy, overwriting the data block in place when a logical data block is modified.

Logically "under" the storage manager 31, to allow the storage server 20 to communicate over the network 2 and/or 4 (e.g., with application server 3 and/or clients 1), the storage operating system 30 also includes a multiprotocol layer 32 and a network access layer 33. The multiprotocol 32 layer implements various higher-level network protocols, such as Network File System (NFS), Common Internet File System (CIFS), Hypertext Transfer Protocol (HTTP), SCSI and/or Internet small computer system interface (iSCSI). The network access layer 33 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also logically under the storage manager 31, to allow the storage server 20 to communicate with the storage devices 5, the storage operating system 30 includes a storage access layer 34 and an associated storage driver layer 35. The storage access layer 34 implements a higher-level disk storage protocol, such as RAID-4, RAID-5 or RAID-DP, while the storage driver layer 35 implements a lower-level storage device access protocol, such as Fibre Channel Protocol (FCP), small computer system interface (SCSI), Serial Attached SCSI (SAS), Serial Advanced Technology Attachment (SATA), or to solid state storage devices (e.g. Flash).

Also shown in FIG. 3 is the path 36 of data flow through the operating system 30, associated with a read or write operation, from the client interface to the primary persistent storage (PPS) interface. Thus, the storage manager 31 accesses the storage devices 5 through the storage access layer 34 and the storage driver layer 35.

Figure 4:
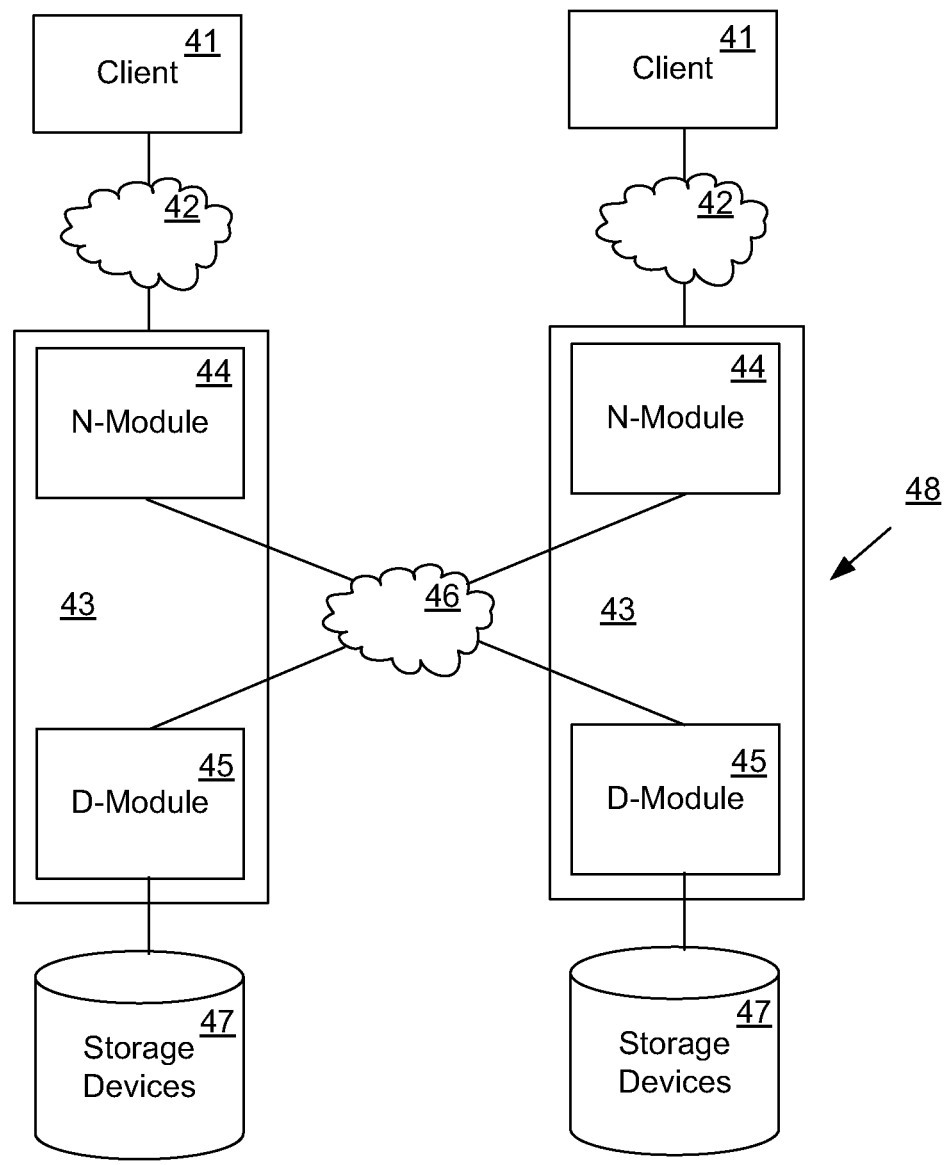
FIG. 4 illustrates another example of a network storage system in which the technique introduced here can be implemented.

FIG. 4 illustrates another example of a network storage system in which the technique introduced here can be implemented. Storage servers 43 are connected to storage devices 47, and a set of clients 41 through interconnect 42 as similarly described for FIG. 1. Each storage server 43 has a distributed architecture with multiple functional modules to divide tasks. In FIG. 4, each storage server 43 has an N-module 44 and a D-module 45, which communicate with each other over an external interconnect 46 or a local interconnect. Also, a storage server 43 can be defined to be any combination of an N-module 44 and a D-module 45, which can be remote from each other across the interconnect 46.

The N-Module 44 includes functionality that enables the storage server 43 to connect to clients 41 over a computer network 42 (e.g. multi-protocol 32 and network access 33 layers), while the D-Module 45 connects to one or more storage devices 47, e.g. disks of a disk array (e.g. the D-module can include storage manager 31, storage access 34, and storage drivers 35). The storage servers 43 are interconnected by a cluster switching fabric 46 which, in the illustrative embodiment, can be embodied as a Gigabit Ethernet switch. It should be noted that while there is shown an equal number of N- and D-Modules in the illustrative cluster 48, there can be differing numbers of N- and/or D-Modules in accordance with various embodiments of the present invention. For example, there can be a plurality of N-Modules and/or D-Modules interconnected in a cluster configuration 48 that does not reflect a one-to-one correspondence between the N and D-Modules. As such, the description of a storage server 43 comprising one N-Module and one D-Module should be taken as illustrative only. Further, the division of N-module and D-module in the storage server 43 is only illustrative to show that the storage server can have a distributed architecture with multiple functional modules. Therefore, the storage server 43 in FIG. 4 can have other types of functional modules than those shown in FIG. 4.

Figure 5A:
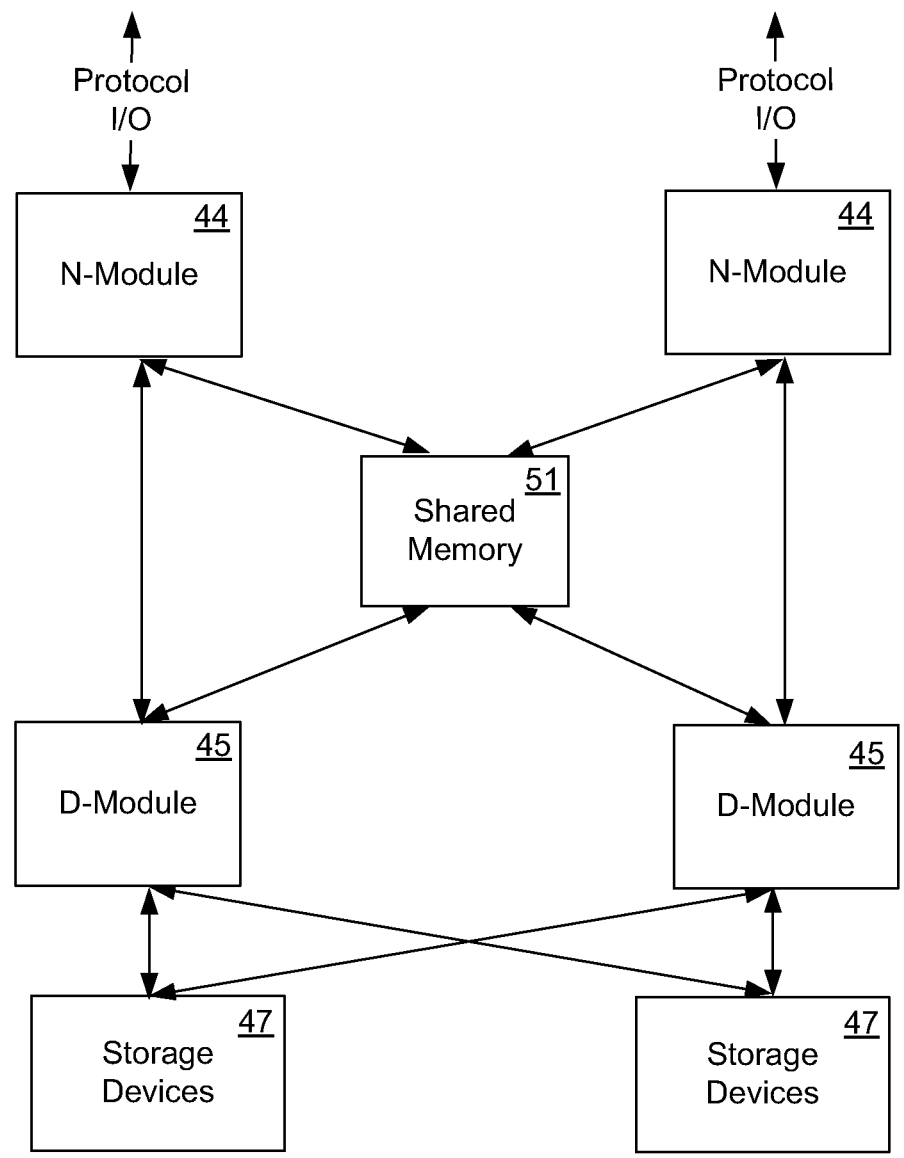
FIG. 5A illustrates one embodiment of a network storage system a memory shared among multiple functional modules.

FIG. 5A illustrates one embodiment of the present invention with a memory shared among multiple functional modules. FIG. 5A shows the basic components—for simplicity a dual module (N-module 44 and D-module 45) version is presented, though the concept extends to any number of modules connected through switched fabrics.

The specific switched components involved can use switched PCIe for connecting multiple modules 44 and 45 to the shared memory 51 components. The storage devices 47 are connected with multiple D-modules 45 for symmetric access to data in each storage device 47. Any N-module 44 can reach any D-module 45, allowing for scaling up D-modules 45 or N-modules 44 according to the need. This structure also allows "location transparency" by migrating volumes among D-modules 45 while allowing N-modules 44 to access data. The multiple modules 44 and 45 and the shared memory 51 can communicate using DMA. For example, any N-module 44 and any D-module 45 in FIG. 5A can read from and/or write to the shared memory 51 using DMA. The shared memory 51 can be physically close to the N- and D-modules to minimize the access latency, but packaging is open to being in one or multiple chassis. In certain embodiments, the shared memory 51 is non-volatile (e.g., battery backed RAM or flash).

The shared memory 51 can be used as both a write-cache and/or as a read cache. For example, data could move directly to the client's I/O devices without transitioning through the memory in the N-module 44. Similarly, the shared memory 51 can receive data from the storage devices through D-module 45 without transiting the memory in the D-module 45. Also, having the shared memory 51 act as a cache allows the N-module 44 to lookup data in this cache directly without making the "hop" to the D-module 45.

To manage the shared memory 51, one mechanism is to partition or segment the shared memory 51 for write access by functional modules (and the I/O ports they own), while allowing read access from any source. In other words, partitioning memory regions reduces the risk of in-memory corruptions. This can be implemented with hardware assistance as well. For example, shared memory can have protection mechanisms which restrict access to read-only, write-only, or read/write based on controller number and address region. All of the access controls can change while the system operates (e.g. as a result of controller failures, system re-configuration).

Figure 5B:
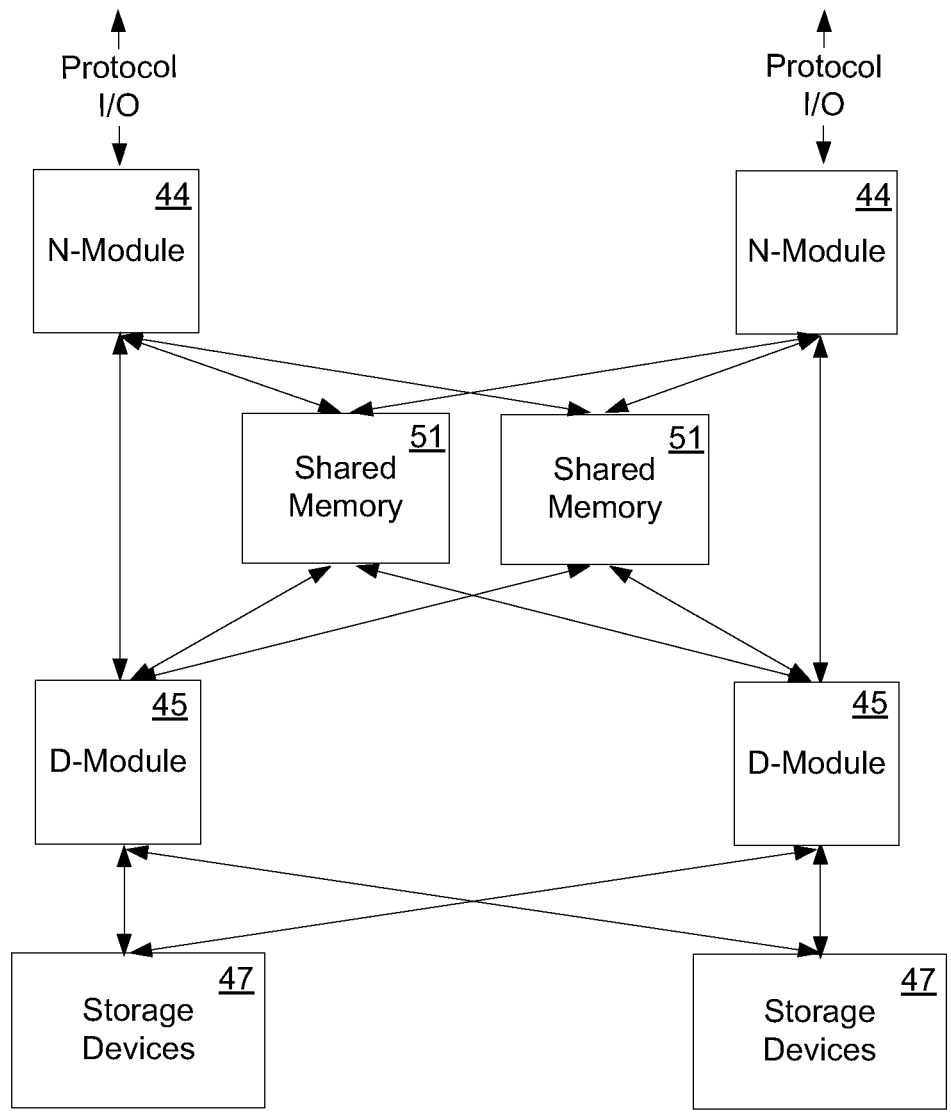
FIG. 5B illustrates one embodiment of a network storage system with multiple memories shared among multiple functional modules.

FIG. 5B illustrates another embodiment of the present invention, which includes two memory components shared among multiple functional modules. One advantage of having two or more shared memories is fault tolerance. If one memory component becomes inaccessible or fails, the other memory or memories can be accessed. Therefore, it can be advantageous to have duplicate data distributed between the two or more shared memories.

In both FIGS. 5A and 5B, each functional module (e.g. N-module 44 or D-module 45) that shares the memory has symmetric structures (e.g. the data path from one N-module 44 and another data path from another N-module 44 go through the same memory 51 that is shared by the N-modules 44) that provides symmetric access to network paths connected to the storage system. The implementation can use various switching technologies as well as multi-ported memory controllers, but the structure can be considered as a redundant n-way ported memory. The switch fabric must contain no Single Point of Failure (SPOF), i.e. it can continue to operate in the presence of a failure. This is done with a redundant fabric. There are two identical memories, each on its own fabric and writing to one automatically reflects the write to the other to provide redundancy. Automatic reflection of contents to the redundant memory can also be part of the structure to lower the total data transfer to and from the N- and D-modules. The automatic reflection of contents avoids separate multiple DMA processes from a functional module (e.g. N-module 44) to multiple memories 51.

FIGS. 5A and 5B are for illustrative purpose only, and any number of shared memories could be connected to any number of functional modules in a storage system to allow communicate among multiple functional modules.

Figure 6:
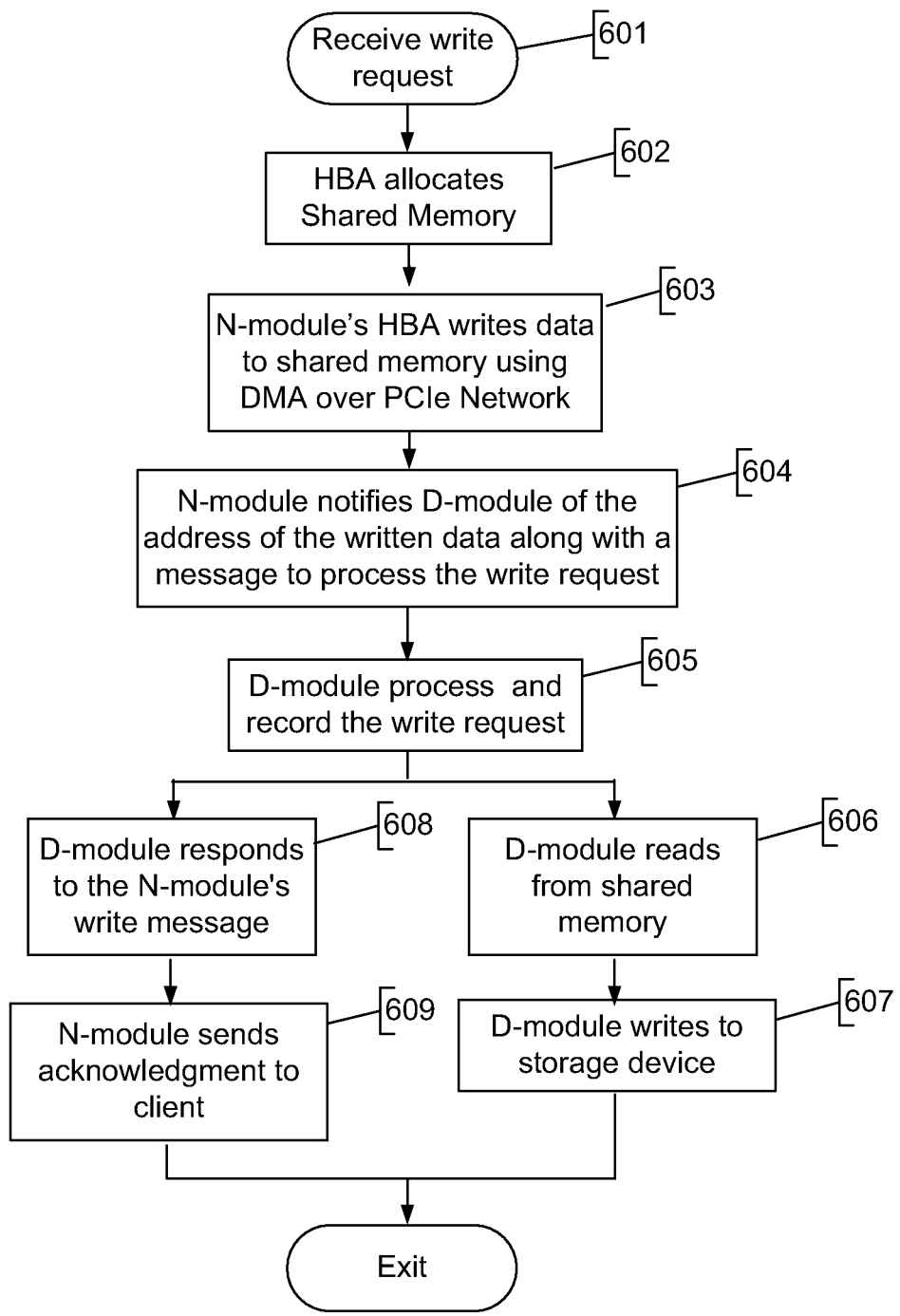
FIG. 6 is a flow diagram showing an example of a process in a storage server for handling a write request.

FIG. 6 is a flow diagram showing an example process in a storage server for handling a write request. At 601, a write request is received at the N-module of the storage server. The request is processed by a protocol stack (e.g., layers 32 and 33 in FIG. 3) and the Host Bus Adapter (HBA) 26 then allocates shared memory (e.g., memory 51 in FIG. 5A) for the data to be written at 602. At 603, the data is then directly written to the shared memory 51 by the N-module's HBA using DMA. An optimization can be to use a single source/multiple destination memory transfer, rather than multiple transactions to place data in redundant locations in shared memory, for fault isolation as shown in FIG. 5B. The interconnection between the N-module and the shared memory 51 can be implemented over a PCIe interconnect, for example.

At 604, the N-module notifies the D-module of the address of the written data along with a message that informs the appropriate D-module that a write request needs to be processed. For the notification, the memory can notify the D-module upon receiving the last data in a transfer, wait until the reflected transfer is complete and then notify the D-module, or have the N-module use a mailbox in the memory to notify the D-module. Mailbox is an area of memory that a CPU can check via a read access or can generate an interrupt to signal a completion of an operation. As stated earlier, a write to one memory is reflected into a redundant memory. The write is not considered complete until both copies are complete. After this is complete, there is no SPOF. The first two methods are automatic notifications setup prior to the transfer, and the last method is using the completion notification to the N-module as the initiator of the notification to the D-module. In one embodiment that provides high-availability, a "partner" D-module is also notified of a second copy of the write data location. High availability (HA) is a system design protocol and associated implementation that ensures a certain absolute degree of operational continuity during a given measurement period. A redundant or "partner" D-module can be implemented for HA along with a duplicate copy of data.

At 605, the D-module processes the write request and records the fact that there is a write data request. Then the D-module reads the data from the shared memory using DMA at 606 and writes the data to a storage device 47 without copying any more data at 607.

In contrast, in certain storage systems, different functional modules need to make multiple duplicate copies of the same data at various points of the data path 36. For example, in certain systems a copy is made at an N-module memory, a D-module main memory, at a high availability (HA) partner, and Non-Volatile Random Access Memory (NVRAM), when the arriving data is first processed through the N-module including a trip through the N-module's memory, then passed to the D-module for another round of processing. By using the shared memory 51 as the main location to have the data copy available in the process of read and write, many of the redundant copies along the data path 36 can be eliminated. [0047] During a subsequent "de-stage" or consistency point operation when "dirty" data is taken from memory and committed to a disk, the D-module that "owns" the portion of the storage device 47 to which the write is destined communicates the appropriate elements of data using DMAs from shared memory 51 to local memory of that D-module, computes RAID parity information and sends I/O signals to appropriate storage devices 47 to store data persistently. To provide further fault tolerance, a high availability (HA) partner storage server can be notified of the data location to use in the event of failure of the primary storage server.

On the other side in FIG. 6, once the D-module has processed the write request and recorded the fact that there's write data request at 605, the D-module responds to the N-module's write message at 608. In an embodiment providing HA, duplicate records for HA have to be in place before the D-module can respond to the N-module. Then the N-module's protocol stack sends acknowledgment in response to the client's write request at 609. The steps of 608 and 609 are asynchronous to the steps of 606 and 607 that involve the consistency point/de-stage processing part.

Figure 7:
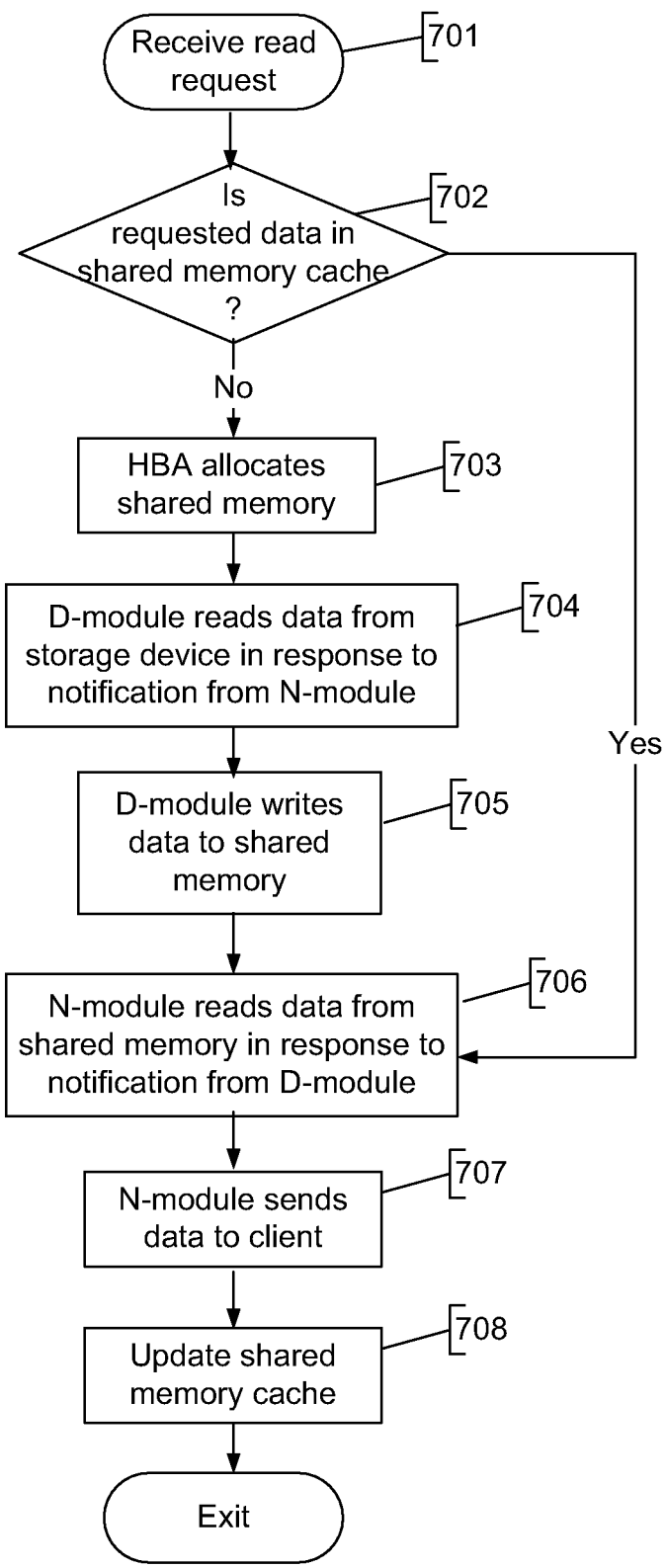
FIG. 7 is a flow diagram showing an example of a process in a storage server for handling a read request.

FIG. 7 is a flow diagram showing an example process in a storage server for handling read request. At 701, a read request is received by the N-module. In one embodiment, after HBA determines whether the requested data is in the shared memory 51 acting as a cache at 702, shared memory is allocated if the requested data is not already in shared memory 51 at 703. When the shared memory is allocated for the data, D-module is notified of this allocation by HBA. Then D-module reads data from the appropriate storage device 47 at 704, and writes data to shared memory 51 at 705 using DMA. At this point, the N-module reads data from the shared memory at 706 using DMA in response to the notification from the D-module, and sends data to client at 707. The shared memory 51 is updated (as a read cache) depending on the expected frequency of the requests for the data at 708. It should be noted that the notification function among multiple functional modules and the shared memory for data placement and memory allocation can be achieved by various other methods and the method described here is not limiting and for illustrative purpose only.

If the requested data is in the shared memory cache at 702, then the N-module reads the requested data directly from the shared memory at 706 to send the data to the requesting client at 707.

Thus, a method and system for using shared memory with optimized dataflow to improve input/output (I/O) throughput and reduce latency in a network storage system have been described. The techniques introduced above can be implemented in special-purpose hardwired circuitry, in software and/or firmware in conjunction with programmable circuitry, or in a combination thereof. Special-purpose hardwired circuitry can be in the form of, for example, one or more application-specific integrated circuits (ASICs), programmable logic devices (PLDs), field-programmable gate arrays (FPGAs), etc.

Software or firmware to implement the techniques introduced here can be stored on a machine-readable medium and can be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A storage system comprising:
    an N-module to enable a storage network server to communicate with clients over a network;
    a first D-module to enable the storage network server to access a set of storage devices and to manage data storage; and
    a first memory and a second memory, each shared by the N-module and the first D-module;
    wherein the N-module and the first D-module communicate data through at least one of the first memory or the second memory without making redundant copies, in the N-module or the first D-module, of the data, and wherein data being communicated by the N-module or the first D-module to another functional module is written to both the first memory and the second memory in a single transaction, and wherein in response to data being written to the first memory and the second memory, the first D-module is notified of a copy of the data in the first memory and a second D-module is notified of a copy of the data in the second memory.

2. A storage system as recited in claim 1, wherein the first memory is partitioned so that each of a plurality of partitions of the first memory is owned by each of a plurality of storage network servers.

3. A storage system as recited in claim 2, wherein a partition of the first memory owned by a storage network server is in use by the storage network server at least until data in the partition of the first memory is successfully written to the storage device or successfully sent to the client.

4. A storage system as recited in claim 1, wherein the first memory is non-volatile.

5. A storage system as recited in claim 1, wherein the N-module and the first D-module each use Direct Memory Access (DMA) to communicate data directly with the first memory.

6. A storage system as recited in claim 1, wherein a portion of the first memory is used as a cache for data transferred between the N-module and the first D-module.

7. A storage system as recited in claim 1, wherein each of the first memory and the second memory is non-volatile.

8. A storage system as recited in claim 1, wherein the first memory is coupled to the N-module and the first D-module by a PCIe interconnection mechanism.

9. A storage system as recited in claim 8, wherein the PCIe interconnection is used to allow any of a plurality of I/O devices and CPU to connect to the first memory and for module to module messaging.

10. A storage system as recited in claim 1, wherein a plurality of N-modules share the first memory and the second memory.

11. A storage system as recited in claim 1, wherein a plurality of D-modules share the first memory and the second memory.

12. A storage system as recited in claim 1, wherein a plurality of N-modules and D-modules share the first memory and the second memory.

13. A storage system comprising:
    an N-module to enable a storage network server to communicate with clients over a network;
    a first D-module to enable the storage network server to access a set of storage devices on behalf of the clients and to manage a logical structure of data on the storage devices; and
    a first memory and a second memory shared by the N-module and the first D-module, wherein a portion of the first memory and the second memory is used as a cache, an interconnection is used to allow any of a plurality of I/O devices and a CPU to connect to the first memory and the second memory and for module to module messaging, and identical data is written to both the first memory and second memory in a single transaction;
    wherein the N-module and the first D-module communicate data through the first memory and the second memory without making redundant copies, in the N-module or the first D-module, of the data, the first memory and the second memory are partitioned so that each of a plurality of partitions of the first memory and the second memory is owned by a plurality of storage servers, the N-module and the first D-module use Direct Memory Access (DMA) to communicate data directly with the first memory and the second memory, and wherein in response to data being written to the first memory and the second memory, the first D-module is notified of a copy of the data in the first memory and a second D-module is notified of a copy of the data in the second memory.

14. A storage system as recited in claim 13, wherein the first memory and the second memory are non-volatile.

15. A storage system as recited in claim 13, wherein the first memory and the second memory are shared by the N-module and the first D-module using PCIe interconnection mechanism.

16. A method comprising:
- receiving from a client a write request or read request of data;
- allocating a part of a first memory and a second memory for the data, wherein the first memory and the second memory are each shared between an N-module and a first D-module of a storage server by an interconnection, wherein the N-module includes functionality to enable the storage server to communicate with clients over a network and the first D-module includes functionality to access a set of storage devices;
- receiving data from a client;
- communicating data between the N-module and both the first memory and the second memory by direct memory access without making redundant copies, in the N-module, of the data;
- communicating data between the first D-module and both the first memory and the second memory by direct memory access without making redundant copies, in the first D-module, of the data;
- communicating data between the first D-module and the storage device; and
- writing a set of data to the first memory and the second memory redundantly in a single transaction; and
- in response to data being written to the first memory and the second memory, notifying the first D-module of a copy of the data in the first memory and notifying a second D-module of a copy of the data in the second memory.

17. A method as recited in claim 16, wherein each of the first memory and the second memory is shared between an N-module and a D-module by PCIe interconnection mechanism.

18. A method as recited in claim 16, wherein each of the first memory and the second memory is non-volatile.

19. A storage system comprising:
- an N-module to enable a storage network server to communicate with clients over a network;
- a first D-module to enable the storage network server to access a set of storage devices and to manage data storage; and
- a first memory and a second memory, each shared by the N-module and the first D-module;
- wherein the N-module and the first D-module communicate data through at least one of the first memory or the second memory without making redundant copies, in the N-module or the first D-module, of the data, and the N-module and the first D-module use a mailbox in the first memory to notify each other, and wherein data being communicated by the N-module or the first D-module to another functional module is written to both the first memory and the second memory in a single transaction, and wherein in response to data being written to the first memory and the second memory, the first D-module is notified of a copy of the data in the first memory and a second D-module is notified of a copy of the data in the second memory.

* * * * *